United States Patent
Han et al.

(10) Patent No.: US 11,971,334 B2
(45) Date of Patent: Apr. 30, 2024

(54) PIPETTING DEVICE

(71) Applicant: SOPHONIX CO., LTD., Beijing (CN)

(72) Inventors: Kuiliang Han, Beijing (CN); Shiliang Zhou, Beijing (CN); Haiyang Zhang, Beijing (CN); Guanghao Li, Beijing (CN)

(73) Assignee: SOPHONIX CO., LTD., Beijing (CN)

( * ) Notice: Subject to any disclaimer, the term of this patent is extended or adjusted under 35 U.S.C. 154(b) by 560 days.

(21) Appl. No.: 17/199,459

(22) Filed: Mar. 12, 2021

(65) Prior Publication Data

US 2021/0199542 A1    Jul. 1, 2021

Related U.S. Application Data

(63) Continuation of application No. PCT/CN2020/104908, filed on Jul. 27, 2020.

(30) Foreign Application Priority Data

Nov. 9, 2019  (CN) .......................... 201911104220.8

(51) Int. Cl.
*G01N 1/14* (2006.01)
*G01N 35/10* (2006.01)

(52) U.S. Cl.
CPC ........... *G01N 1/14* (2013.01); *G01N 35/1009* (2013.01); *G01N 35/1065* (2013.01)

(58) Field of Classification Search
CPC .. G01N 1/14; G01N 35/1009; G01N 35/1065; G01N 35/1016
USPC ....................................... 73/864.35
See application file for complete search history.

(56) References Cited

U.S. PATENT DOCUMENTS

| | | | |
|---|---|---|---|
| 4,256,153 A | 3/1981 | Lamaziere | |
| 6,374,683 B1 | 4/2002 | Hunicke-Smith et al. | |
| 6,589,483 B1 | 7/2003 | Maeda | |
| 2018/0203028 A1* | 7/2018 | Ito | G01N 35/1009 |
| 2019/0255533 A1* | 8/2019 | Wilmer | B01L 3/0279 |

FOREIGN PATENT DOCUMENTS

| | | | |
|---|---|---|---|
| CN | 103163310 | | 6/2013 |
| CN | 103990504 | | 8/2014 |
| CN | 108772358 A | * | 11/2018 |
| CN | 110038657 A | * | 7/2019 |
| CN | 110823642 | | 2/2020 |
| CN | 211205886 | | 8/2020 |
| DE | 3921729 | | 1/1991 |
| DE | 3921729 A1 | * | 1/1991 |
| JP | 2015175707 | | 10/2015 |

* cited by examiner

*Primary Examiner* — Marrit Eyassu
(74) *Attorney, Agent, or Firm* — Cooper Legal Group, LLC (57) ABSTRACT

A pipetting device includes a portal frame. The portal frame is arranged with a bearing device for bearing a feed pump, a driving mechanism for driving the bearing device to move up and down, and a liquid suction and injection mechanism for sucking or injecting liquid by the feed pump. The bearing device includes a bearing plate with receiving grooves. The driving mechanism includes a first bracing plate connected to the bearing plate, and the frame is arranged with a first motor. The liquid suction and injection mechanism includes a second bracing plate. The first bracing plate is arranged with a second motor. The first motor and the second motor are connected to a PLC.

8 Claims, 5 Drawing Sheets

PIPETTING DEVICE

CROSS-REFERENCE TO RELATED APPLICATION

The present application is a continuation of international application of PCT application No. PCT/CN2020/104908 filed on Jul. 27, 2020, which claims the priority benefit of China application No. 201911104220.8 filed on Nov. 9, 2019. The entirety of each of the above-mentioned patent application is incorporated herein by reference and made a part of this specification.

BACKGROUND

Technical Field

This application relates to the technical field of medical devices, and more particularly, to a pipetting device.

Description of Related Art

A pipetting device is widely used in biochemical research laboratories, hospitals, and pharmaceutical companies, and can be used for sample pretreatment, sample purification and amplification, sample dilution and concentration, sample preparation and other sample treatment operations, and generally comprises a pipetting sleeve, a piston rod, an insertion nozzle and the like. When the liquid is sucked, the liquid is sucked into the pump cavity under the action of negative pressure in the pipetting sleeve along with the pull-out of the piston rod in the pipetting sleeve; and similarly, when the piston rod is pushed, the liquid with the same volume as the space through which the piston rod moves can be pushed out.

The traditional pipetting device generally includes a pipetting sleeve based on the principle of an injection pump, a piston rod is arranged in the pipetting sleeve, pipetting is performed by manually pushing the piston rod, such a working mode is low in working efficiency, and low in liquid suction and injection precision.

Along with the improvement of science and technology, in an existing pipetting device, a plurality of piston rods are driven by a driving mechanism to reciprocate simultaneously in a plurality of pipetting sleeve, and a plurality of pipetting channels conduct liquid suction and injection operation at the same time. In the pipetting device, debugging is tedious in the assembling process of the feed pump, and the maintenance is laborious and time-consuming. When a plurality of pipetting channels work simultaneously, the piston rods and pipetting sleeves cannot be well matched, and the phenomena that multiple pairs of piston rods and pipetting sleeves are inconsistent in the working process and the piston rods and the pipetting sleeves are jammed easily occur, and the feeding precision and accuracy are affected.

SUMMARY

It is an objective of the present application to provide a pipetting device, so that the feed pump of the device and the pump rod of the feed pump are high in cooperating precision and coaxiality, the feed pump has high liquid suction and injection precision, stable operation and free of vibration, and has accurate displacement and high degree of automation.

The objective of the present application is achieved by the following technical solutions.

A pipetting device includes a portal frame. The portal frame is arranged with a bearing device for bearing a feed pump, a driving mechanism for driving the bearing device to move up and down, and a liquid suction and injection mechanism for sucking or injecting liquid by the feed pump. The bearing device includes a bearing plate horizontally arranged in the frame, and a front side of the bearing plate is formed with a plurality of vertical receiving grooves with front openings. Each of the receiving grooves is embedded with a feed pump, an upper end of a feed pipe of the feed pump is arranged with a barrier, the feed pump between the barrier and the bearing plate is sleeved with an elastic member. The front side of the bearing plate is fixedly connected to an outer cover that includes a vertical cover plate fixedly connected to the bearing plate and a pallet at a lower end of the vertical cover plate. The pallet is perpendicular to the vertical cover plate and extends in a direction towards the feed pump. The pallet is arranged with an inserting hole corresponding to the feed pipe of the feed pump, the feed pipe of the feed pump penetrates through the inserting hole, and the barrier abuts against the pallet. The driving mechanism includes a horizontal first bracing plate fixedly connected to a rear side of the bearing plate, a horizontal supporting plate fixed on two vertical side walls of the frame is arranged under the first bracing plate, an upper end of the frame is fixedly connected to a first motor that is vertically arranged, an output end of the first motor is connected to a vertical first lead screw, the first bracing plate is fixedly arranged with first lead screw nuts engaged with the first lead screw, and the first bracing plate is further arranged with a first guiding mechanism for guiding the first bracing plate to move up and down. The liquid suction and injection mechanism includes a second bracing plate arranged above the first bracing plate, a rear side of the first bracing plate is arranged with a motor frame, an upper end of the motor frame is fixedly arranged with a vertical second motor, an output end of the second motor is connected to a vertical second lead screw, the second bracing plate is fixedly arranged with second lead screw nuts engaged with the second lead screw, the second bracing plate is further arranged with a second guiding mechanism for guiding the second bracing plate to move up and down, and a front side of the second bracing plate is arranged with an engaging portion for engaging a push handle of the feed pump. The first motor and the second motor are connected to a PLC that coordinates movement of the first motor and the second motor.

By adopting the above technical solutions, the first motor can drive the first bracing plate, the bearing plate, the feed pump, the outer cover and the second bracing plate to move up and down together through the first lead screw. When the first motor rotates forwards to drive the first bracing plate and the second bracing plate to move downwards simultaneously, the feed pump moves downwards, a feed pipe of the feed pump is in a reagent liquid suction area, then the second motor drives the second bracing plate to move upwards through the second lead screw, and the engaging portion on the second bracing plate drives the push handle of the feed pump to move upwards. The push handle drives the pump rod of the feed pump to move upwards, so that the feed pump generates negative pressure, and the feed pump sucks liquid. The first motor rotates reversely to drive the feed pump to move upwards again to reserve a moving passage for the test kit, a reagent liquid injection area moves to the position below the feed pipe of the feed pump, the first motor rotates forwards again to drive the first bracing plate and the second bracing plate to move downwards simultaneously, and the first motor rotates forwards again to drive the feed pump to move downwards, so that the feed pipe of the feed pump is in the reagent liquid injection area, then the second motor drives the second bracing plate to move downwards through the second lead screw, the push handle of the feed pump loses the support of the engaging portion of the second bracing plate, the pump rod of the feed pump injects a test solution in the feed pump into the reagent liquid injection area under the action of an elastic member in the feed pump. The process is repeated in cycles to suck or inject the test solution, thereby completing the pipetting work.

Preferably, the first guiding mechanism includes first sliding holes respectively formed in the first bracing plate on both sides of the first lead screw, a vertical first sliding bar penetrates each of the first sliding holes, and both ends of each the first sliding bars are fixedly connected to the upper end of the frame and the supporting plate, respectively. The second guiding mechanism includes second sliding holes respectively formed in the second bracing plate on both sides of the second lead screw, a vertical second sliding bar penetrates each of the second sliding holes, and both ends of each the second sliding bars are fixedly connected to the upper end of the frame and the supporting plate, respectively.

By adopting the above technical solutions, the first sliding bar slides in the first sliding hole, so that the up-and-down running stability of the first bracing plate is ensured. The second sliding bar slides in the second sliding hole, so that the up-and-down running stability of the second bracing plate is ensured.

Preferably, the first sliding hole is fixedly arranged with a coaxial first sliding sleeve, and the first sliding sleeve is slidably connected to the first sliding bar. The second sliding hole is fixedly arranged with a coaxial second sliding sleeve, and the second sliding sleeve is slidably connected to the second sliding bar.

By adopting the above technical solutions, the first sliding bar slides in the first sliding sleeve, so that the up-and-down running of the first bracing plate is smoother; the second sliding bar slides in the second sliding sleeve, so that the up-and-down running of the second bracing plate is smoother.

Preferably, the engaging portion includes a T-shaped engaging groove formed in the second bracing plate and having an opening facing the vertical cover plate, the engaging groove extends through the second bracing plate, and the engaging groove includes a first groove portion for receiving the push handle of the feed pump and a second groove portion formed at a lower end of the first groove portion for receiving a pump bar of the feed pump.

By adopting the above technical solutions, the push handle of the feed pump abuts against the first groove portion, the pump rod can be driven to move upwards when the engaging portion moves upwards, the feed pump generates negative pressure to suck liquid, the second groove portion is used for receiving the pump rod of the feed pump, it is guaranteed that the pump rod of the feed pump and the feed pump move in the coaxial direction, and liquid suction or liquid injection is smoothly conducted.

Preferably, the other end of the first lead screw away from the first motor and the other end of the second lead screw away from the second motor are both free ends.

By adopting the above technical solutions, the other end of the first lead screw away from the first motor and the other end of the second lead screw away from the second motor are both free ends on the premise of ensuring smooth up-down movement of the first bracing plate and the second bracing plate, thereby reducing the volume of the device and facilitating maintenance.

Preferably, the first bracing plate is provided with escaping holes for the second sliding bar and the second lead screw, respectively. The second bracing plate is provided with escaping holes for the first sliding bar and the first lead screw, respectively.

By adopting the above technical solutions, escaping holes are arranged such that the first sliding bar, the second sliding bar, the first lead screw and the second lead screw can be mounted smoothly, thereby guaranteeing up-down movement of the first bracing plate and the second bracing plate can move upwards and downwards without hindrance.

Preferably, the feed pipe is nested with a tip head, and a tip head removing mechanism is further arranged under the pallet, for removing the tip head from the feed pipe of the feed pump.

By adopting the above technical solutions, for the avoidance of cross infection, the tip head is disposable, and the tip head is separated by the tip head removing mechanism.

Preferably, the tip head removing mechanism includes an L-shaped separation plate arranged below the pallet, the separation plate includes a vertical plate and a separation sheet connected to a lower end of the vertical plate, the separation sheet is perpendicular to the vertical plate and extends in the direction towards the feed pump, the separation sheet is formed with a groove corresponding to the feed pipe of the feed pump, both ends of the separation sheet are each fixedly connected to a vertical push rod, the bearing plate is formed with a through hole corresponding to the push rod, the push rod penetrates upwards through the through hole, an upper end of the push rod is arranged with a stopper, and the push rod between the stopper and the bearing plate is sleeved with a separation spring.

By adopting the above technical solutions, after the liquid injection is completed, the second motor drives the second lead screw to make the second bracing plate continue to move downwards, and then the second bracing plate presses down the push rod, the push rod drives the separation plate to move downwards, and the groove on the separation sheet presses the tip head, to push the tip head away from the feed pipe of the feed pump and complete the operation of removing the tip head.

Preferably, the bearing plate is arranged with eight receiving grooves.

By adopting the above technical solutions, eight feed pumps are respectively placed in the receiving grooves, when the first motor drives the first bracing plate and the second bracing plate to move upwards and downwards, eight feed pumps can be moved synchronously at a time, so that eight test solutions can be sucked or injected synchronously, thereby greatly improving the pipetting efficiency and production efficiency.

To sum up, the beneficial technical effects of the present application are as follows.

1. The bearing device bears the feed pump, and the driving mechanism drives the bearing device to move up and down, so that the feed pipe of the feed pump can enter the reagent liquid suction area and the reagent liquid injection area. The liquid suction and injection mechanism lifts or releases the push handle of the feed pump, so as to achieve sucking or injecting liquid by the feed pump. The feed pump has steady displacement, the feed pump and the pump rod of the feed pump are good in coaxiality, and the device has high reagent liquid suction and injection precision, and high degree of automation.

2. The first guiding mechanism and the second guiding mechanism are arranged such that the up-down movement of the first bracing plate and the second bracing plate is high in precision and stable in running.

3. The tip head removing mechanism is arranged such that the tip head is separated from the feed pipe of the feed pump by the tip head removing mechanism to prevent cross infection, after one-time liquid injection is completed.

DESCRIPTION OF THE EMBODIMENTS

The present application is further illustrated in detail in combination with the accompanying drawings hereinafter.

As shown in FIG. 1 to FIG. 6, there is provided a pipetting device, which includes a portal frame 1. The portal frame 1 is arranged with a bearing device 3 for bearing a feed pump 2, a driving mechanism 4 for driving the bearing device 3 to move up and down and a liquid suction and injection mechanism 5 for sucking or injecting liquid by the feed pump 2.

The bearing device 3 includes a bearing plate 31 horizontally arranged in the frame 1, and a front side of the bearing plate 31 is formed with a plurality of vertical receiving grooves 32 with front openings. Each of the receiving grooves 32 is embedded with a feed pump 2, an upper end of a feed pipe of the feed pump 2 is arranged with a barrier 33, and the feed pump 2 between the barrier 33 and the bearing plate 31 is sleeved with an elastic member 34. The front side of the bearing plate 31 is fixedly connected to an outer cover 35, the outer cover 35 includes a vertical cover plate 351 fixedly connected to the bearing plate 31 and a pallet 352 at a lower end of the vertical cover plate 351. The pallet 352 is perpendicular to the vertical cover plate 351 and extends in a direction towards the feed pump 2. The pallet 352 is arranged with inserting holes 3521, each of which corresponds to the feed pipe of the feed pump 2, the feed pipe of the feed pump 2 penetrates through the inserting hole 3521, and the barrier 33 abuts against the pallet 352.

The driving mechanism 4 includes a horizontal first bracing plate 41 fixedly connected to a rear side of the bearing plate 31. A horizontal supporting plate 42 fixed on two vertical side walls of the frame 1 is arranged under the first bracing plate 41. An upper end of the frame 1 is fixedly connected to a first motor 43 that is vertically arranged. An output end of the first motor 43 is connected to a vertical first lead screw 44. The first bracing plate 41 is fixedly arranged with a first lead screw nut 45 engaged with the first lead screw 44. The first bracing plate 41 is also arranged with a first guiding mechanism 46 for guiding the first bracing plate 41 to move up and down.

The liquid suction and injection mechanism 5 includes a second bracing plate 51 arranged above the first bracing plate 41. A rear side of the first bracing plate 41 is arranged with a motor frame 52, an upper end of the motor frame 52 is fixedly arranged with a vertical second motor 53. An output end of the second motor 53 is connected to a vertical second lead screw 54. The second bracing plate 51 is fixedly arranged with a second lead screw nut 55 engaged with the second lead screw 54. The second bracing plate 51 is also arranged with a second guiding mechanism 56 for guiding the second bracing plate 51 to move up and down. A front side of the second bracing plate 51 is arranged with an engaging portion 6 for engaging a push handle of the feed pump 2.

The first motor 43 and the second motor 53 are connected to a programmable logic controller (PLC) that coordinates movement of the first motor 43 and the second motor 53.

The first motor 43 drives the first bracing plate 41, the bearing plate 31, the feed pump 2, the outer cover 35 and the second bracing plate 51 to move up and down together through the forward and reverse rotation of the first lead screw 44. When the first motor 43 rotates forwards to drive the first bracing plate 41 and the second bracing plate 51 to move downwards simultaneously, the feed pump 2 moves downwards, a feed pipe of the feed pump 2 is in a reagent liquid suction area. Then, the second motor 53 rotates forwards to drive the second bracing plate 51 to move upwards through the second lead screw 54, and the engaging portion 6 on the second bracing plate 51 drives the push handle of the feed pump 2 to move upwards. The push handle drives the pump rod of the feed pump 2 to move upwards, so that the feed pump 2 generates negative pressure, and the feed pump sucks liquid. The first motor 43 rotates reversely to drive the first bracing plate 41 and the second bracing plate 51 to move downwards simultaneously, namely, the first motor 43 drives the feed pump 2 to move upwards to reserve a moving passage for the test kit, a reagent liquid injection area moves to the position below the feed pipe of the feed pump 2, the first motor 43 rotates forwards again to drive the first bracing plate 41 and the second bracing plate 51 to move downwards simultaneously, so that the feed pipe of the feed pump 2 is in the reagent liquid injection area. Then the second motor 53 rotates reversely to drive the second bracing plate 51 to move downwards through the second lead screw 54. The push handle of the feed pump 2 loses the support of the engaging portion 6 of the second bracing plate 51, and the pump rod of the feed pump 2 injects a test solution in the feed pump 2 into the reagent liquid injection area under the action of an elastic member in the feed pump 2. The process is repeated in cycles to suck or inject the test solution, thereby completing the pipetting work.

In this embodiment, in order to improve the precision and the smoothness of the movement of the first bracing plate 41 and the second bracing plate 51, the first lead screw 44 and the second lead screw 54 are both T-shaped screws.

When the feed pump 2 is assembled, firstly, the elastic member 34 is sleeved on the outer side of the feed pump 2, and the elastic member 34 abuts against the stopper 93 and the bearing plate 31 respectively, then the feed pump 2 is placed in the receiving groove 32, a certain gap exists between the feed pump 2 and the receiving groove 32, meanwhile, a pump rod and a push handle of the feed pump 2 are assembled in the engaging portion 6, then the feed pipe of the feed pump 2 penetrates through the inserting hole 3521 of the outer cover 35, the cover plate 351 of the outer cover 35 is fixed with the bearing plate 31, the pallet 352 of the outer cover 35 abuts against the barrier 33, the bearing plate 31 and the outer cover 35 are enclosed to enable the feed pump 2 to only generate displacement in the axial direction, and the feed pump 2 is flexibly mounted in the receiving groove 32 and the engaging portion 6 through the elastic member 34.

When the pump rod of the feed pump 2 is matched with the feed pump 2, the pump rod of the feed pump 2 and the feed pump 2 have no external force in the radial direction, thereby guaranteeing coaxiality of the pump rod and the feed pump 2, and meanwhile, when the pump rod of the feed pump 2 moves upwards along with the engaging portion 6, the elastic member 34 can provide buffering for the engaging portion 6 and the pump rod of the feed pump 2, so that the pump rod of the feed pump 2 moves gently, and a better liquid suction and injection effect is achieved. When a plurality of feed pumps 2 are mounted on the bearing plate 31, the elastic member 34 is compressed, it can be guaranteed that the eight feed pumps 2 can be stably embedded in the receiving grooves 32, respectively, the plurality of feed pumps 2 cannot move in the vertical direction, and the plurality of feed pumps 2 can synchronously suck liquid or inject liquid.

In this embodiment, the tip head 8 is mounted on the feed pump 2. When the tip head 8 is mounted, the tip head 8 is under a feed pipe of the feed pump 2. When the feed pump 2 moves downwards, the feed pipe of the feed pump 2 is inserted into the tip head 8, and at this time, the first motor 43 further drives the first bracing plate 41 and the second bracing plate 51 to continuously move downwards by a distance. At this time, the elastic member 34 is compressed by the bearing plate 31, so that the feed pipe of the feed pump 2 is flexibly connected with the tip head in an inserted mode, preventing hard collision to the tip head in the downward moving process of the feed pump 2 and guaranteeing accuracy and reliability of tip head installation.

The elastic member 34 can provide buffering for the engaging portion 6 and the pump rod of the feed pump 2, so that the pump rod of the feed pump 2 moves gently, and a better liquid suction and injection effect is achieved.

The forward and reverse rotation and the running time of the first motor 43 and the second motor 53 are all coordinately controlled by the PLC.

In this embodiment, the first guiding mechanism 46 includes first sliding holes 461 respectively formed in the first bracing plates 41 on both sides of the first lead screw 44. Two vertical first sliding bars 462 penetrate the first sliding holes 461 respectively, and both ends of each of the first sliding bars 462 are fixedly connected to the upper end of the frame 1 and the supporting plate 42, respectively. The second guiding mechanism 56 includes second sliding holes 561 respectively formed in the second bracing plates 51 on both sides of the second lead screw 54. Two vertical second sliding bars 562 penetrate the second sliding holes 561 respectively, and both ends of each of the second sliding bars 562 are fixedly connected to the upper end of the frame 1 and the supporting plate 42, respectively.

The first sliding bar 462 slides in the first sliding hole 461, so that the up-and-down running stability of the first bracing plate 41 is ensured. The second sliding bar 562 slides in the second sliding hole 561, so that the up-and-down running stability of the second bracing plate 51 is ensured.

Furthermore, the first sliding hole 461 is fixedly arranged with a coaxial first sliding sleeve 463, and the first sliding sleeve 463 is slidably connected to the first sliding bar 462. The second sliding hole 561 is fixedly arranged with a coaxial second sliding sleeve 563, and the second sliding sleeve 563 is slidably connected to the second sliding bar 562.

The first sliding bar 462 slides in the first sliding sleeve 463, so that the up-and-down running of the first bracing plate 41 is smoother. The second sliding bar 562 slides in the second sliding sleeve 563, so that the up-and-down running of the second bracing plate 51 is smoother.

The other end of the first lead screw 44 away from the first motor 43 and the other end of the second lead screw 54 away from the second motor 53 are both free ends.

The other end of the first lead screw 44 away from the first motor 43 and the other end of the second lead screw 54 away from the second motor 53 are both free ends on the premise of ensuring smooth up-down movement of the first bracing plate 41 and the second bracing plate 51, thereby reducing the volume of the device and facilitating maintenance.

The first bracing plate 41 is provided with two escaping holes 7 for the second sliding bar 562 and the second lead screw 54, respectively. The second bracing plate 51 is provided with two escaping holes 7 for the first sliding bar 462 and the first lead screw 44, respectively.

The escaping holes 7 are arranged such that the first sliding bar 462, the second sliding bar 562, the first lead screw 44 and the second lead screw 54 can be mounted smoothly, thereby guaranteeing up-down movement of the first bracing plate 41 and the second bracing plate 51 can move upwards and downwards without hindrance.

The feed pipe is nested with a tip head 8, and a tip head removing mechanism 9 is also arranged under the pallet 352, for removing the tip head 8 from the feed pipe of the feed pump 2.

For the avoidance of cross infection, the tip head 8 is disposable, therefore, after completion of liquid suction and injection, the tip head 8 needs to be separated from the feed pipe of the feed pump 2, and the tip head 8 is separated by the tip head removing mechanism 9.

Figure 6:
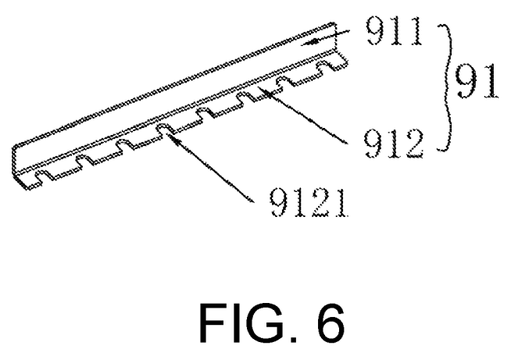
FIG. 6 is a structural schematic diagram of a separation plate according to the present application.

In this embodiment, the tip head removing mechanism 9 includes an L-shaped separation plate 91 arranged below the pallet 352. The separation plate 91 includes a vertical plate 911 and a separation sheet 912. The separation sheet 912 is connected to a lower end of the vertical plate 911, is perpendicular to the vertical plate 911, and extends in the direction towards the feed pump 2. The separation sheet 912 is formed with a plurality of grooves 9121, each of which corresponding to the feed pipe of the feed pump 2. Both ends of the separation sheet 912 are respectively and fixedly connected to a vertical push rod 92. The bearing plate 31 is formed with a through hole 36 corresponding to the push rod 92. The push rod 92 penetrates through the through hole 36 upwards, an upper end of the push rod 92 is arranged with a stopper 93, and the push rod 92 between the stopper 93 and the bearing plate 31 is sleeved with a separation spring 94.

Figure 1:
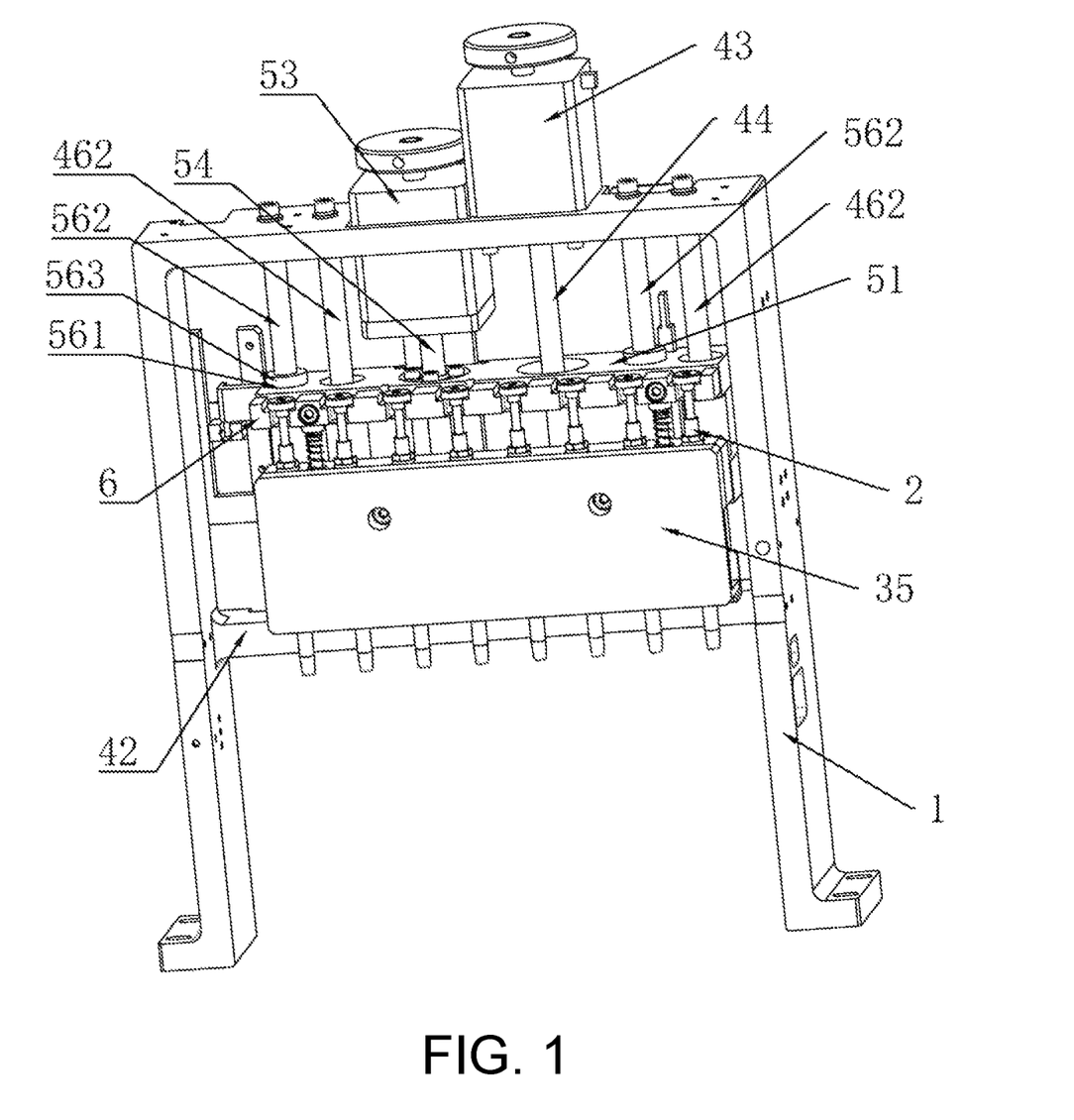
FIG. 1 is a structural schematic diagram according to the present application.
Figure 2:
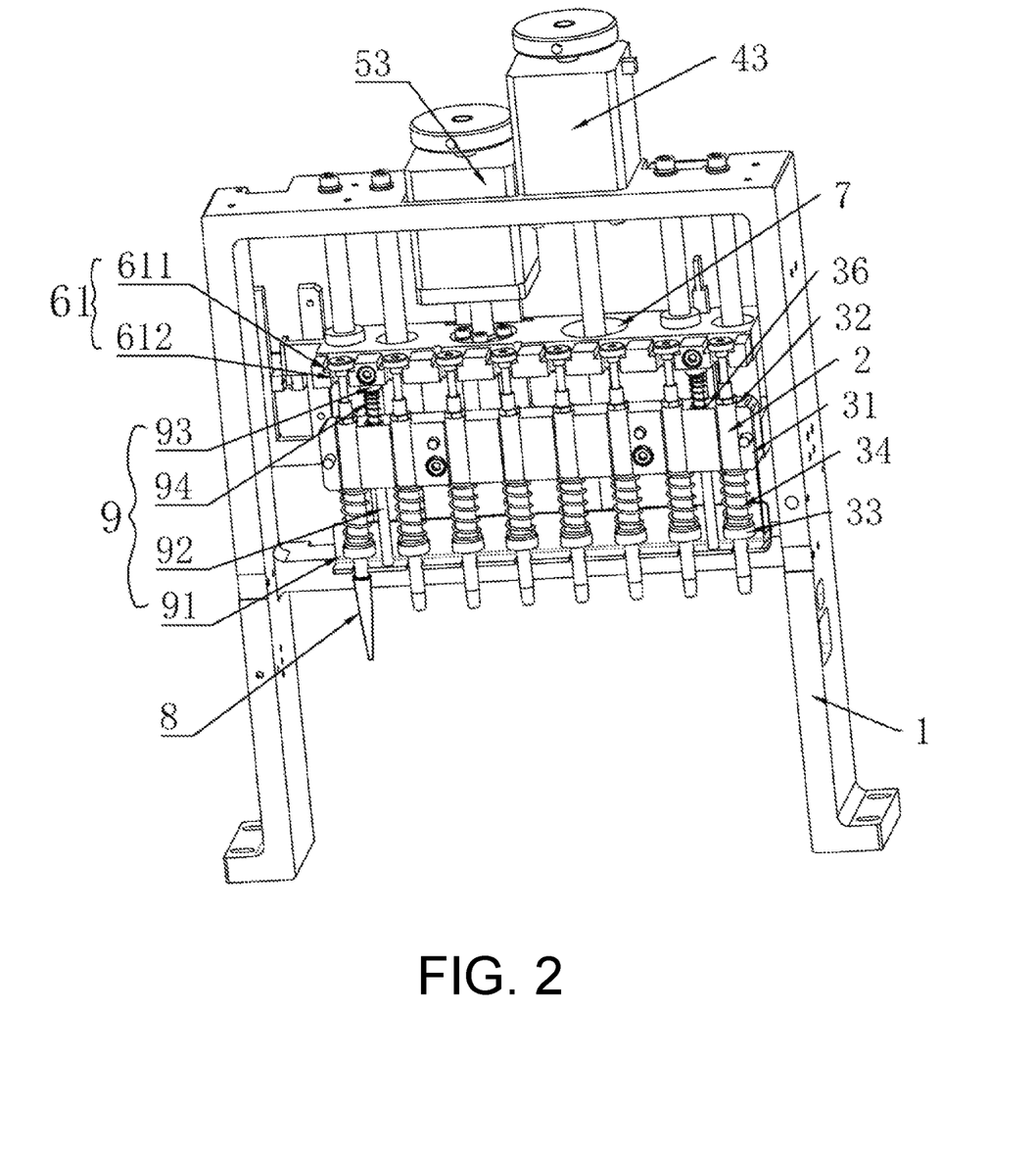
FIG. 2 is a structural schematic diagram according to the present application, with an outer cover being removed.
Figure 3:
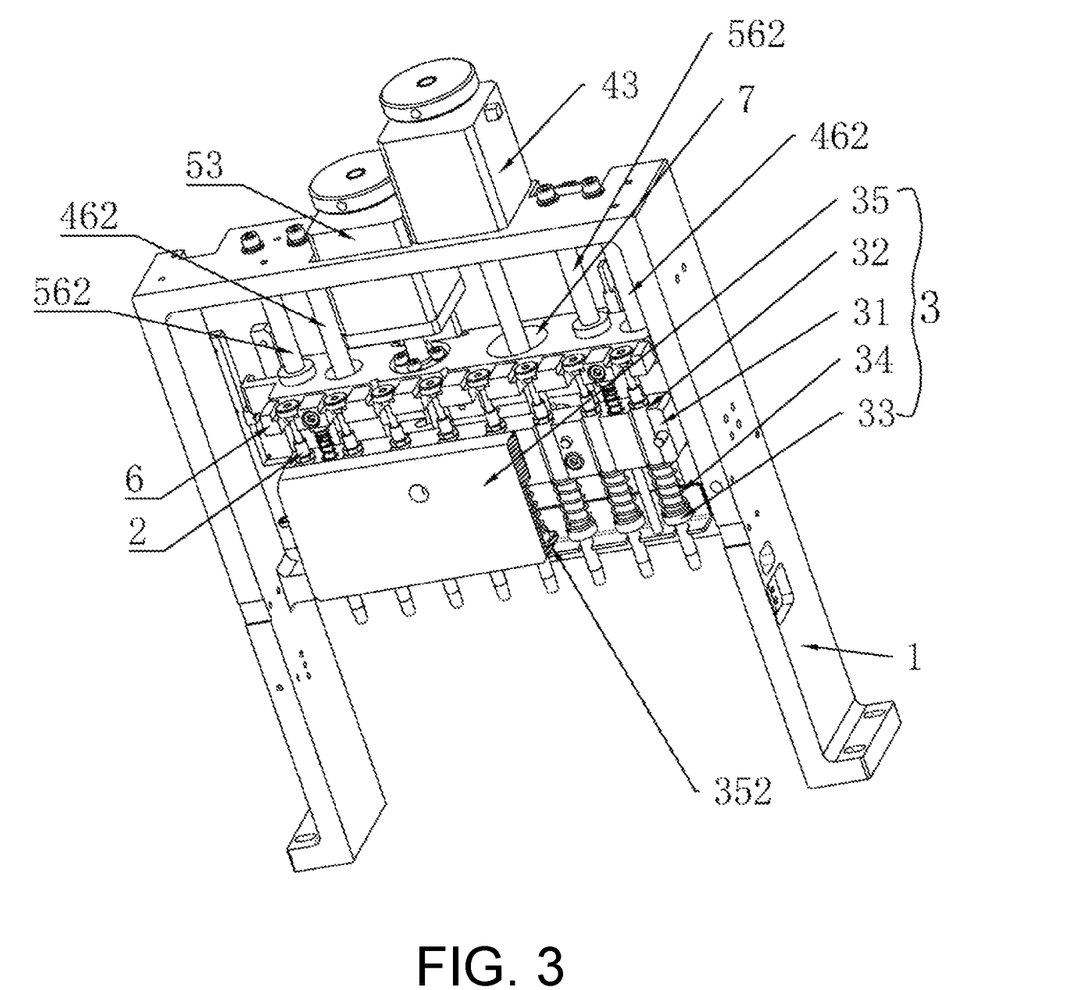
FIG. 3 is a cross-sectional view according to the present application.
Figure 4:
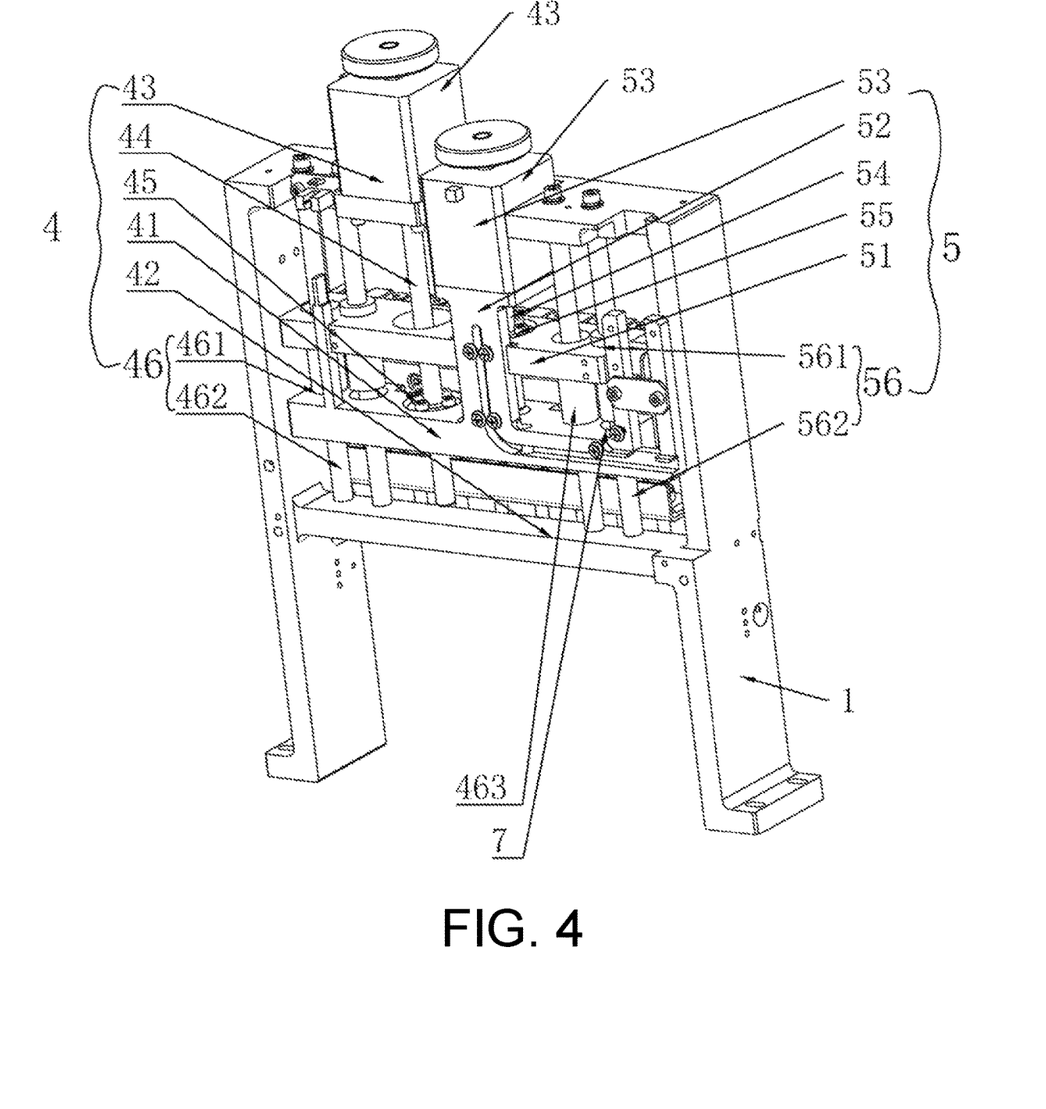
FIG. 4 is a structural schematic diagram according to the present application from another perspective.
Figure 5:
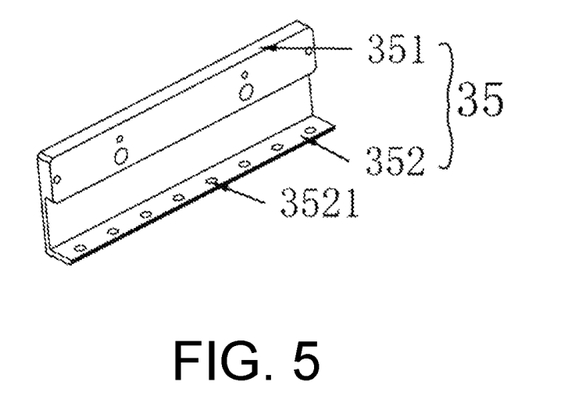
FIG. 5 is a structural schematic diagram of an outer cover according to the present application.

As shown in FIG. 4, after each liquid injection is completed, the second motor 53 drives the second lead screw 54 to make the second bracing plate 51 continue to move downwards, and then the second bracing plate 51 presses down the push rod 92, the push rod 92 overcomes the elastic force of the separation spring 94 to drive the separation plate 91 to move downwards, and the groove 9121 on the separation sheet 912 presses the tip head 8, to push the tip head 8 away from the feed pipe of the feed pump 2 and complete the operation of removing the tip head 8.

The engaging portion 6 includes a T-shaped engaging groove 61 formed in the second bracing plate 51 and having an opening facing the cover plate 351. The engaging groove 61 penetrates through the second bracing plate 51, the clamping groove 61 includes a first groove portion 611 and a second groove portion 612 at a lower end thereof, the first groove portion 611 receives the push handle of the feed pump 2 and abuts against the lower end thereof, and the second groove portion 612 receives the pump rod of the feed pump 2.

In this embodiment, the first groove portion 611 and the second groove portion 612 are both cylindrical grooves. The diameter of the first groove portion 611 is larger than that of the second groove portion 612, so that the push handle of the feed pump 2 does not disengage from the second groove portion 612 after the push handle of the feed pump 2 is snapped into the first groove portion 611, and it is ensured that the push handle of the feed pump 2 drives the pump rod of the feed pump 2 to move upwards in the process that the engaging portion 6 moves upwards. A gap is left between a push handle of the feed pump 2 and the first groove portion 611, the lower end of the first groove portion 611 abuts against the lower end of the push handle of the feed pump 2. A gap is left between a pump rod of the feed pump 2 and the second groove portion 612, it is guaranteed that the clamping portion 6 can be separated from the push handle of the feed pump 2 and slide downwards along the pump rod of the feed pump 2 in the working process of removing the tip head 8. The second bracing plate 51 presses down the push rod 92, the push rod 92 pushes down the separation sheet 912, and the separation sheet 912 pushes the tip head 8 away from the feed pipe of the feed pump 2.

By means of the opening facing the cover plate 351 formed on the bracing plate 51, and front openings in the receiving grooves 32 of the bearing plate 31, the feed pump 2, the pump rod of the feed pump 2, and the push handle of the feed pump 2 can be loaded into the receiving groove 32 and the clamping portion 6 from the front side, thereby facilitating installation and maintenance.

The push handle of the feed pump 2 abuts against the first groove portion 611, the engaging portion 6 moves upwards to drive the pump rod of the feed pump 2 to move upwards, so that the feed pump 2 generates negative pressure to suck liquid. The second groove portion 612 is used for receiving the pump rod of the feed pump 2, so that the feed pump 2 and the pump rod of the feed pump 2 have no external force in the radial direction, thereby guaranteeing coaxiality of the feed pump 2 and the pump rod of the feed pump 2, and ensuring smoothness and precision of the liquid suction and liquid injection operation.

In this embodiment, the bearing plate 31 is arranged with eight receiving grooves 32. Eight feed pumps 2 are respectively placed in the receiving grooves 32, when the first motor 43 drives the first bracing plate 41 and the second bracing plate 51 to move upwards and downwards, eight feed pumps can be moved synchronously at a time, so that eight test solutions can be sucked or injected synchronously, thereby greatly improving the pipetting efficiency and production efficiency.

The above description is only preferred embodiments of the present application and is not intended to limit the protection scope of the present application. Therefore, all equivalent changes of the structure, shape or principle according to the spirit of the present application should be all included in the protection scope of the present application.

What is claimed is:

1. A pipetting device, comprising a portal frame, wherein the portal frame is arranged with a bearing device for bearing a feed pump, a driving mechanism for driving the bearing device to move up and down, and a liquid suction and injection mechanism for sucking or injecting liquid by the feed pump;

the bearing device comprises a bearing plate horizontally arranged in the portal frame, a front side of the bearing plate is formed with a vertical receiving groove with a plurality of front openings, each vertical receiving groove is embedded with the feed pump, an upper end of a feed pipe of the feed pump is arranged with a barrier, the feed pump between the barrier and the bearing plate is sleeved with an elastic member, the front side of the bearing plate is fixedly connected to an outer cover that comprises a vertical cover plate fixedly connected to the bearing plate and a pallet at a lower end of the vertical cover plate, the pallet is perpendicular to the vertical cover plate and extends towards a direction of the feed pump, the pallet is arranged with an inserting hole corresponding to the feed pipe of the feed pump, the feed pipe of the feed pump penetrates through the inserting hole, and the barrier abuts against the pallet;

the driving mechanism comprises a horizontal first bracing plate fixedly connected to a rear side of the bearing plate, a horizontal supporting plate fixed on two vertical side walls of the portal frame is arranged under the horizontal first bracing plate, an upper end of the portal frame is fixedly connected to a first motor vertically arranged, an output end of the first motor is connected to a vertical first lead screw, the horizontal first bracing plate is fixedly arranged with first lead screw nuts engaged with the vertical first lead screw, and the horizontal first bracing plate is also arranged with a first guiding mechanism for guiding the horizontal first bracing plate to move up and down;

the liquid suction and injection mechanism comprises a second bracing plate arranged above the horizontal first bracing plate, a rear side of the horizontal first bracing plate is arranged with a motor frame, an upper end of the motor frame is fixedly arranged with a vertical second motor, an output end of the vertical second motor is connected to a vertical second lead screw, the second bracing plate is fixedly arranged with second lead screw nuts engaged with the vertical second lead screw, the second bracing plate is also arranged with a second guiding mechanism for guiding the second bracing plate to move up and down, and a front side of the second bracing plate is arranged with an engaging portion for engaging a push handle of the feed pump;

the first motor and the vertical second motor are connected to a programmable logic controller (PLC) that coordinates movement of the first motor and the vertical second motor;

wherein the engaging portion comprises a T-shaped engaging groove formed in the second bracing plate and having an opening facing the vertical cover plate, the T-shaped engaging groove extends through the second bracing plate, and the T-shaped engaging groove comprises a first receiving groove for receiving the push handle of the feed pump and a second receiving groove formed at a lower end of the first receiving groove for receiving a pump rod of the feed pump.

2. The pipetting device according to claim 1, wherein the first guiding mechanism comprises first sliding holes respectively formed in the horizontal first bracing plate on both sides of the vertical first lead screw, a vertical first sliding bar penetrates each of the first sliding holes respectively, and both ends of each the vertical first sliding bars are respectively fixedly connected to the upper end of the portal frame and the horizontal supporting plate; the second guiding mechanism comprises second sliding holes respectively formed in the second bracing plate on both sides of the vertical second lead screw, a vertical second sliding bar penetrates each of the second sliding holes respectively, and both ends of each the vertical second sliding bars are respectively fixedly connected to the upper end of the portal frame and the horizontal supporting plate.

3. The pipetting device according to claim 2, wherein each of the first sliding holes is fixedly arranged with a coaxial first sliding sleeve, and the coaxial first sliding sleeve is slidably connected to the vertical first sliding bar; each of the second sliding holes is fixedly arranged with a coaxial second sliding sleeve, and the coaxial second sliding sleeve is slidably connected to the vertical second sliding bar.

4. The pipetting device according to claim 2, wherein the horizontal first bracing plate is provided with escaping holes for the vertical second sliding bar and the vertical second lead screw; the second bracing plate is provided with escaping holes for the vertical first sliding bar and the vertical first lead screw.

5. The pipetting device according to claim 1, wherein an end of the vertical first lead screw and an end of the vertical second lead screw are both free ends.

6. The pipetting device according to claim 1, wherein the feed pipe is nested with a tip head, and a tip head removing mechanism is also arranged under the pallet for removing the tip head from the feed pipe of the feed pump.

7. The pipetting device according to claim 6, wherein the tip head removing mechanism comprises an L-shaped separation plate arranged below the pallet, the L-shaped separation plate comprises a vertical plate, a lower end of the vertical plate is arranged with a separation sheet perpendicular to the L-shaped separation plate and extends towards the direction of the feed pump, the separation sheet is formed with a groove corresponding to the feed pipe of the feed pump, both ends of the separation sheet are respectively and fixedly connected to a vertical push rod, the bearing plate is formed with a through hole corresponding to the vertical push rod, the vertical push rod penetrates through the through hole upwards, an upper end of the vertical push rod is arranged with a stopper, and the vertical push rod between the stopper and the bearing plate is sleeved with a separation spring.

8. The pipetting device according to claim 1, wherein the bearing plate is arranged with eight receiving grooves.

* * * * *